METHOD AND APPARATUS FOR MANUFACTURING PRESSURIZED LAMPS

Filed Nov. 1, 1962 8 Sheets-Sheet 1

INVENTORS
D. WALLACE ALCOTT
ROBERT N. SECK
BY Morgan, Finnegan, Durham & Pine
ATTORNEYS

METHOD AND APPARATUS FOR MANUFACTURING PRESSURIZED LAMPS

Filed Nov. 1, 1962 8 Sheets-Sheet 2

INVENTORS
D. WALLACE ALCOTT
ROBERT N. SECK
BY
Morgan, Finnegan, Durham & Pine
ATTORNEYS Sept. 29, 1964 D. W. ALCOTT ETAL 3,150,952
METHOD AND APPARATUS FOR MANUFACTURING PRESSURIZED LAMPS
Filed Nov. 1, 1962 8 Sheets-Sheet 3
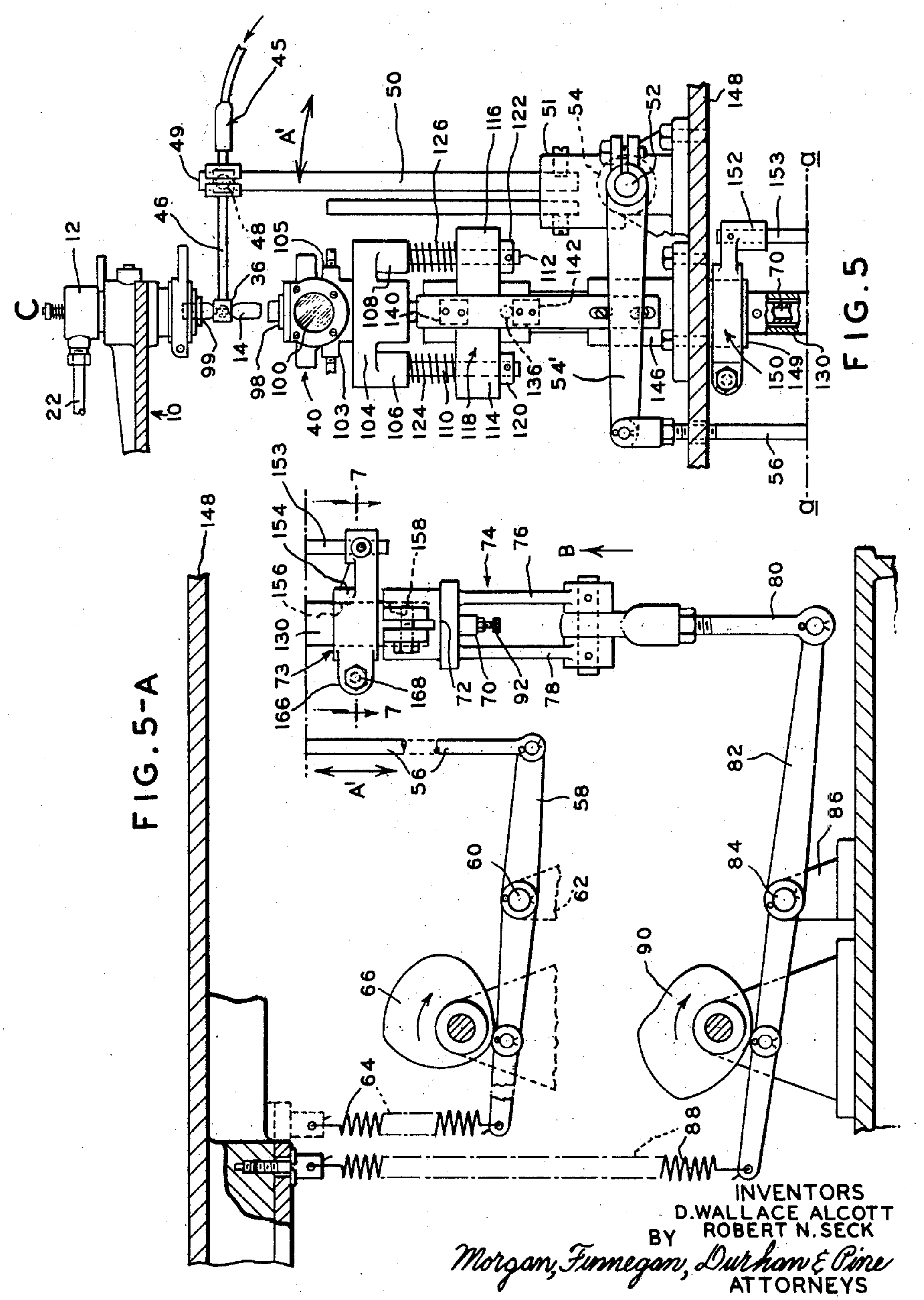
FIG. 5, FIG. 5-A
INVENTORS
D. WALLACE ALCOTT
ROBERT N. SECK
BY Morgan, Finnegan, Durham & Pine
ATTORNEYS

METHOD AND APPARATUS FOR MANUFACTURING PRESSURIZED LAMPS

Filed Nov. 1, 1962

INVENTORS
D. WALLACE ALCOTT
ROBERT N. SECK
BY
Morgan, Finnegan, Durham & Pine
ATTORNEYS INVENTORS
D. WALLACE ALCOTT
ROBERT N. SECK
BY
Morgan, Finnegan, Durham & Pine
ATTORNEYS

METHOD AND APPARATUS FOR MANUFACTURING PRESSURIZED LAMPS

Filed Nov. 1, 1962

INVENTORS
D. WALLACE ALCOTT
ROBERT N. SECK
BY
Morgan, Finnegan, Durham & Pine
ATTORNEYS INVENTORS
D. WALLACE ALCOTT
ROBERT N. SECK
BY Morgan, Finnegan, Durham & Pine
ATTORNEYS

METHOD AND APPARATUS FOR MANUFACTURING PRESSURIZED LAMPS

Filed Nov. 1, 1962 8 Sheets-Sheet 8

INVENTORS
D. WALLACE ALCOTT
ROBERT N. SECK
BY
Morgan, Finnegan, Durham & Pine
ATTORNEYS

3,150,952
METHOD AND APPARATUS FOR MANUFACTURING PRESSURIZED LAMPS

David W. Alcott, 326 Rolling Rock Road, Mountainside, N.J., and Robert N. Seck, R.D. 2, Box 180, Farmingdale, N.J.

Filed Nov. 1, 1962, Ser. No. 234,890
21 Claims. (Cl. 65—105)

The present invention relates to a novel apparatus and method of forming vitreous envelopes and, more particularly, to an improved means and process for sealing pressurized incandescent or photoflash lamps.

In the production of pressurized incandescent lamps, especially of the miniature photoflash lamps, serious problems have been encountered heretofore in sealing or tipping-off the end of the pressurized tubular envelope to form a hermetically-sealed lamp unit. To produce a pressurized envelope, it is necessary to seal or tip-off the open end of a tube while still maintaining the internal pressure in the envelope. This is usually done by heating the wall of the tubular envelope until it softens and collapses, whereupon the lamp becomes sealed at that point. However, because of the internal pressures in the envelope, the tubular envelope, when softened, tends to expand, not collapse.

To overcome this tendency of the pressurized envelope to expand when heated, the method and means most generally employed heretofore involves performing the tipping-off operation in a chamber pressurized to at least the same extent as the envelope.

Lamps of the pressurized type are generally formed on a horizontal intermittently-rotating turret with the various manufacturing operations performed automatically at a series of work stations. In the conventional devices heretofore available, an hermetic chamber was formed about the pressurized tube envelope at the tipping-off station. After the chamber was pressurized to a pressure equal to the pressure in the envelope, a burner inside the sealed chamber effected the tipping-off operation of the lamp by heating the envelope wall until it collapsed.

In other tipping-off devices, a method of tipping-off was employed which utilized a pressure within the chamber higher than the pressure in the envelope so that, upon softening of the envelope tube in the chamber, the greater pressure within the chamber caused an inward collapse of the tube at the softened section. Originally, all these operations occurred at a single work station, but because of the number of successive operations the pressurized chamber, through which the tubular envelope was travelled, was extended over a number of work stations in an attempt to increase production.

In still another attempt to solve the lamp tip-off problem, the tubular envelope was subjected to treatment with liquid nitrogen. This lowered the temperature of the envelope to the point that the gas to be encapsulated was introduced into the chilled envelope at a pressure approximately equal to the external atmospheric pressure. The tipping-off operation was then accomplished as quickly as possible to maintain the envelope at its low temperature. As the sealed envelope reached the ambient room temperature, the chilled encapsulated gas warmed, thereby developing the desired internal pressure in the sealed lamp.

It will be evident that these prior methods suffered from a number of deficiencies. The use of a hermetically sealed chamber slowed operations. In addition, the preservation of an hermetic chamber around moving parts of the turret was extremely difficult, especially in full scale plant operations. Further, keeping the burner torches properly adjusted in a pressurized atmosphere necessitated complex moisture control equipment. The method involving liquid nitrogen entailed special nitrogen handling equipment and was costly. Likewise, the many variables between successive tubular envelopes; such as, envelope volume, room temperature, barometric pressure, etc., resulted in internal lamp pressures which varied substantially from lamp to lamp. This lamp pressure variation also occurred in the hermetically-sealed chamber method when the chamber was improperly sealed.

The present invention is characterized by a novel method of tipping-off the tubular envelope. In the present device, the tubular envelope undergoes the conventional manufacturing operations until the envelope approaches the pressurizing and tipping-off stations on the forming turret. In the present invention, after evacuation, the tubular envelope is pre-pressurized to a pressure approximately equal to atmospheric pressure. At the next successive turret work station the tubular envelope is preheated to soften the neck station thereof. However, since the internal pressure in the envelope is approximately equal to the external pressure, the neck, though softened, remains open.

At the next work station the tubular envelope is indexed into position at the pressurizing and tipping-off chamber. At this station, the internal tube pressure is increased to the desired final pressure level, generally to about 75 p.s.i. However, before pressurizing, the neck portion of the tubular envelope is heated until the neck section is softened to the desired amount. The heating elements are then withdrawn and the tubular envelope is surrounded by an outer housing or sealed chamber. Pressure corresponding to the desired lamp pressure is simultaneously admitted into the lamp and the chamber. Then pressure in the housing surrounding the tubular envelope is increased to effect an inward collapse of the tube at the softened section to form an hermetically sealed pressurized lamp unit at one end of the tubular envelope.

The chamber is then withdrawn and the tubular envelope is travelled to successive turret work stations where the portion of the tubular envelope other than the sealed lamp unit is evacuated, the lamp unit severed from the stem section tubular envelope and deposited into a delivery chute and the stem section ejected from the turret exhaust head.

The underlying principle of operation of the present invention resides in recognizing and utilizing the fact that heated glass cools relatively slowly. Thus, in the present invention, the heat is applied to the tubular envelope at the torch chamber before the tubular envelope is surrounded by the sealing chamber. The tube remains heated to a softened state sufficiently long enough to effect withdrawal of the heating elements and positioning and operation of the sealing chamber. Since these operations are performed at a single turret station in rapid successive steps, a substantial increase in production rate is achieved. Likewise, there is no sealing problem since the envelope is stationary when surrounded by the vertically-movable sealing chamber. Unlike the devices heretofore, the tube softening of the present invention occurs in the atmosphere before the sealing chamber is positioned around the tubular envelope. The heating units are readily accessible and can be adjusted without dismantling of the sealing chamber. Further, there is no necessity of travelling the tubular envelope through the chamber with the various problems inherent in such an arrangement employed heretofore.

*Objects*

It is therefore the principal object of the present invention to provide an improved method and apparatus for the sealing off of exhaust tubes of vessels, such as photoflash lamps.

Another object of the present invention is to provide a novel method of sealing a photoflash lamp wherein the section to be sealed is heated to softened consistency prior to pressurizing and sealing of the lamp to the desired internal pressure.

A further object of the invention is to provide novel high-speed apparatus for producing pressurized vessels, such as photoflash lamps wherein the lamps are pressured and sealed in successive operations at a single work station of a turret-type exhaust machine.

An added object of the present invention is the provision of a travelling sealing chamber adapted to move into and out of operative position around the stationary heated tube, effecting pressurizing and sealing of said tube to form the lamp.

It is likewise an object of the present invention to provide an improved process for the production of pressurized photoflash lamps including a novel sequence of operations, including the steps of pre-pressurizing the tube, preheating the neck thereof, heating the neck section to sealing consistency, pressurizing the interior of the tube and its intermediate surrounding area to a first given pressure higher than atmosphere, increasing the pressure of the intermediate surrounding area to a second given pressure to effect sealing of the tube at the heated section thereof to form the pressurized lamp unit.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

FIGURE 5 is a front view of the mechanism shown in FIGURE 3, illustrating the sealing chamber operative mechanism and illustrating the operation of the burner members.

FIGURE 5A is a continuation of FIGURE 5 taken on line *a—a* of FIGURE 5.

*General Description*

Figure 1:
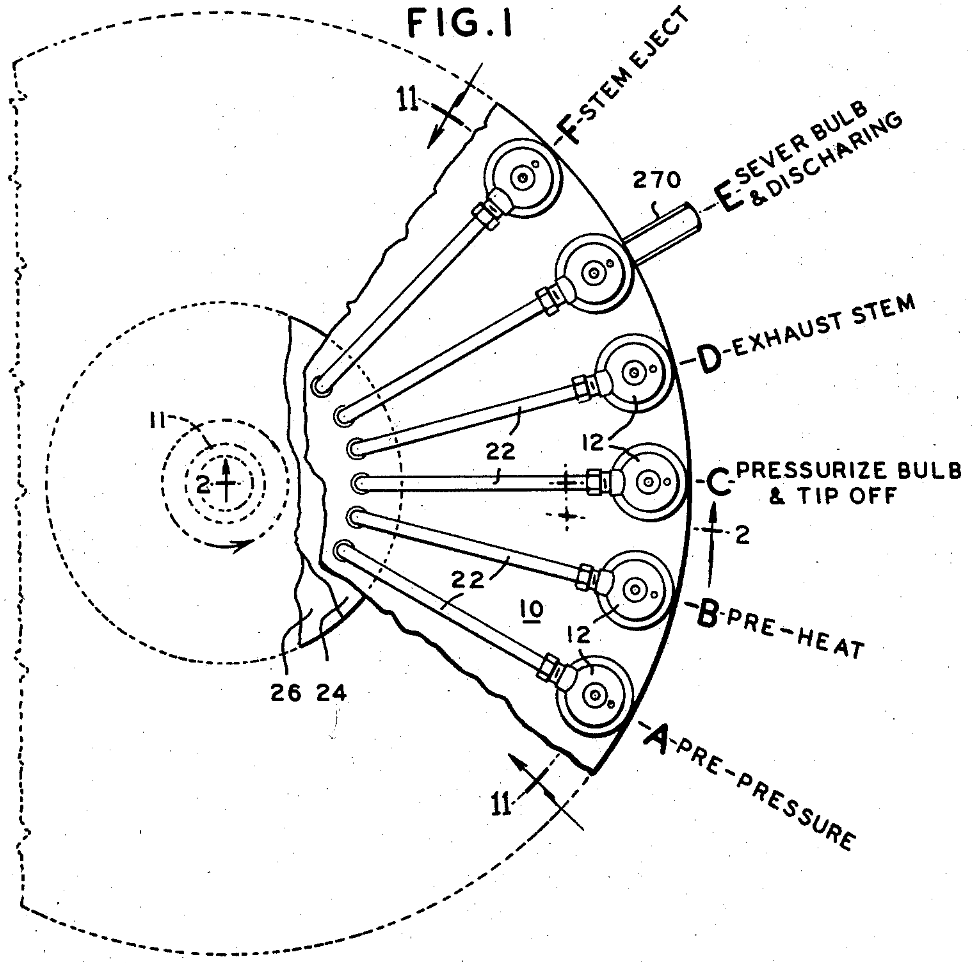
FIGURE 1 is a fragmentary plan view of a conventional turret-type exhaust machine illustrating schematically the various work stations concerned with the present invention.
Figure 2:
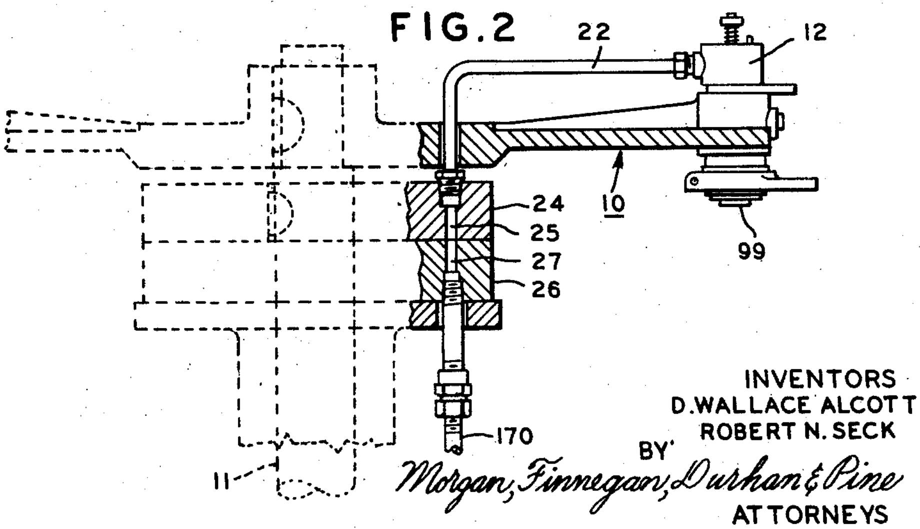
FIGURE 2 is a sectional view taken along line 2—2, FIGURE 1, illustrating the typical consrtuction of an exhaust head.

Turning to the drawings and specifically to FIGURES 1 and 2, there is illustrated a portion of a conventional turret-type exhaust machine, designated generally 10, substantially similar in construction and operation to the device disclosed in U.S. Patent 2,113,798, issued April 12, 1938, to D. Mullan. Turret 10 is adapted to support a plurality of exhaust heads 12 and travel these exhaust heads 12 through a series of successive work stations. Turret 10 may be intermittently indexed to travel each head 12 to the next successive work station by any suitable indexing mechanism; such as shown in U.S. Patent 2,569,852, issued October 2, 1951, to J. H. Green.

Figures 6, 8:
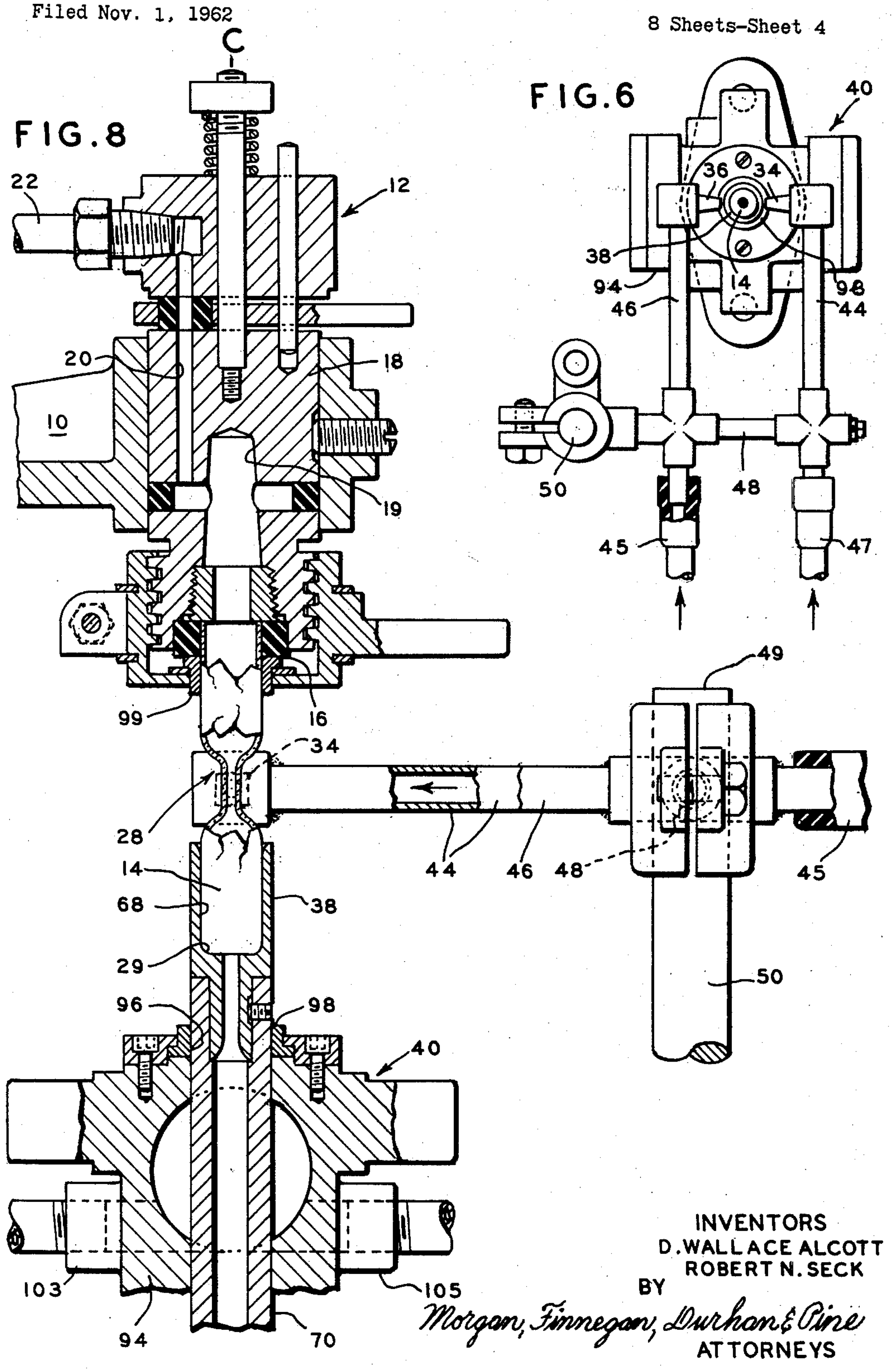
FIGURE 6 is a sectional view taken along line 6—6, FIGURE 3.
FIGURE 8 is a detailed sectional view of an exhaust head and lamp unit shown indexed into position at the start of the tipping-off operation.
Figure 11:
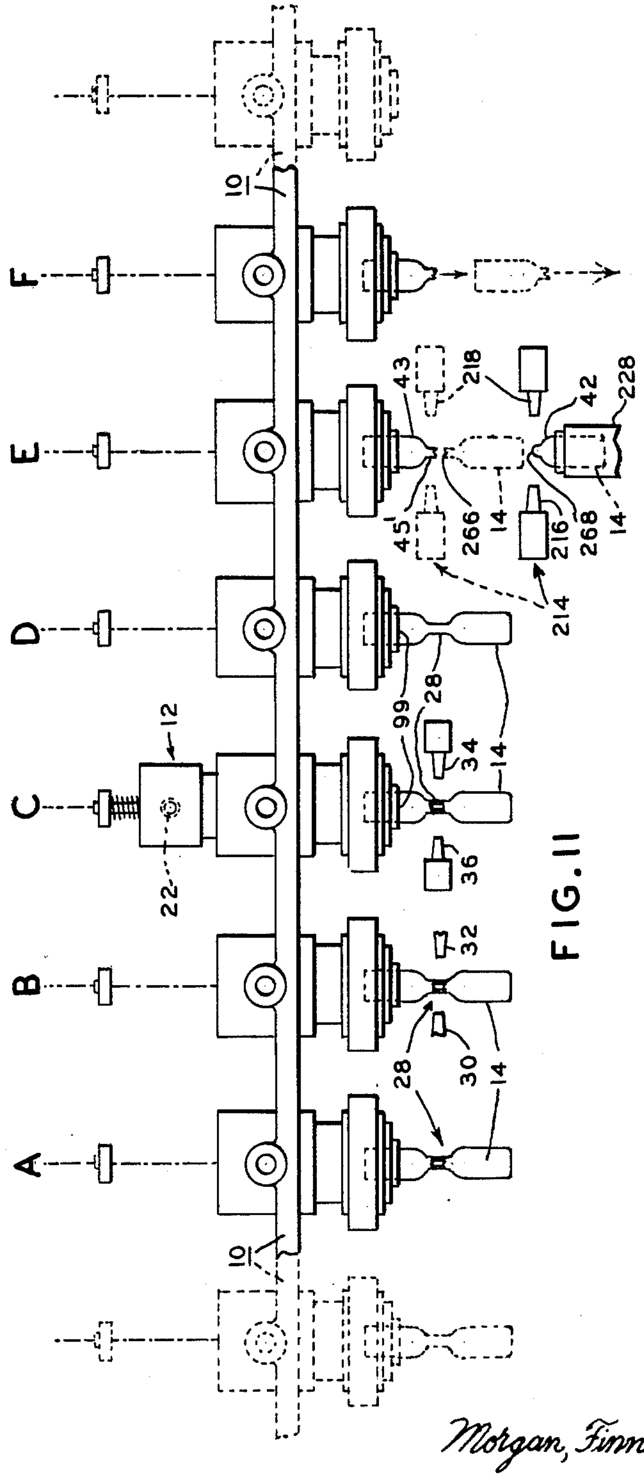
FIGURE 11 is a development view taken along line 11—11, FIGURE 1, and illustrating schematically the sequence of operations in the tipping-off process.
Figure 10:
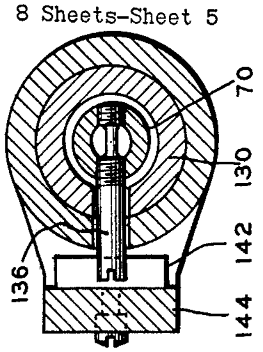
FIGURE 10 is a sectional view taken along line 10—10, FIGURE 3.
Figure 9:
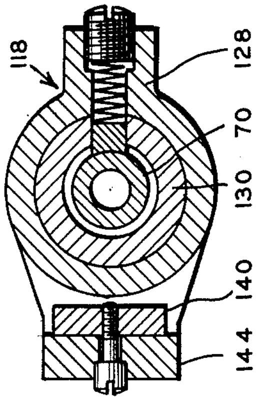
FIGURE 9 is a sectional view taken along line 9—9, FIGURE 3.
Figure 7:
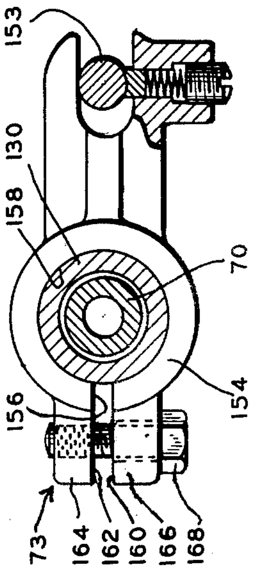
FIGURE 7 is a sectional view taken along line 7—7, FIGURE 5.

Turning to FIGURE 8, where it is shown best, a sealed-in photoflash lamp 14 is secured on turret 10 in a rubber bushing 16 carried by the exhaust head cap 18. Head cap 18 has a hollow interior section 19 connected by a riser 20 to a sweep 22. Sweep 22 in turn is connected to its associated port 25 in a suitable master rotary exhaust valve 24 mounted in common and rotatable with turret 10. Master rotary valve 24, it will be understood, has a plurality of ports 25 corresponding to the number of sweeps 22 and heads 12.

Coacting with rotary valve 24 is a master stationary valve 26, mounted in common with the central shaft 11 of turret 10, but not rotatable therewith. At appropriate stations, each port 25 is aligned with a port 27 in valve 26 in turn communicating with an exhausting system (not shown) or with a gas-fill supply system (see FIGURE 17), depending on the operation to be performed at that station on turret 10.

During the course of operations of turret 10, the sealed-in lamp 14 is loaded, the lamp is then evacuated through the exhaust system (not shown). When head 12 is indexed into position at station A (FIGURE 1), its associated sweep 22 and port 25 in rotary exhaust valve 24 is aligned in cooperating relationship with a port 27 in master stationary valve 26. At station A, port 27, in turn, communicates with a suitable gas supply unit (not shown) to fill lamp 14 with gas (preferably oxygen) at approximately atmospheric pressure; namely, 15–20 p.s.i.

At station B, the neck section 28 of sealed-in lamp 14 is subjected to pre-heating means comprising a pair of opposed burners 30 and 32, preferably mounted for movement together into and out of operative position adjacent the neck section 28 of a lamp 14 indexed to station B on turret 10. It will be understood that, even though the neck section 28 is heated, since the pressure inside and outside lamp 14 is approximately equal, the neck section 28 of lamp 14 will not blow out as when the internal pressure is greater than the external, nor will it collapse inwardly as when the external pressure is greater than the internal pressure. The pressurizing of lamp 14 at station A insures that the neck section 28 thereof will remain open after pre-heating at station B.

Station C comprises the actual tipping-off or sealing station. Lamps 14, pre-heated at their neck sections 28, are indexed seriatum into position at station C by turret 10.

As soon as a lamp 14 is positioned at station C, movable tipping-off burners 34 and 36 are travelled into position on opposite sides of neck 28 to heat this section to a dull red tipping-off temperature (approximately 1500° F.). To prevent droop or elongation of lamp 14 at softened neck section 28, a tube support cup 38 is moved into support position beneath and in contact with the projecting rounded bottom section 29 of lamp 14 simultaneously with the movement into operative position of tipping-off burners 34 and 36.

When neck section 28 is heated to the proper degree, burners 34 and 36 are rotated away from operative position adjacent lamp 14. With the movement of burners 34 and 36 away from lamp 14, pressure chamber 40 is travelled upwardly into sealing position around lamp 14. When chamber 40 is in sealed position surrounding lamp 14, pressure is admitted concurrently into lamp 14 through its associated exhaust head 13 and into chamber 40. The pressure admitted into chamber 40 is equal to the pressure admitted into lamp 14 and corresponds to the desired end pressure for the sealed photoflash lamp of approximately 60–75 p.s.i.

When lamp 14 has been completely pressurized to its desired end pressure, the pressure in chamber 40 is increased beyond that in lamp 14 (preferably to 90± p.s.i.). Since neck section 28 of lamp 14 is still softened due to the fact that glass loses its heat relatively slowly, a fact ignored heretofore, the increased pressure in chamber 40 causes an inward collapse of the lamp 14 at neck section 28, producing an hermetically sealed lamp unit 42.

When lamp 14 has been sealed to produce hermetically sealed unit 42, the pressure to chamber 40 is released and chamber 40 returned to its non-operative position to await the next successive lamp 14 indexed to station C. Likewise, support cup 38 is withdrawn until the next sealing operation of the machine.

At station D, the pressure to lamp 14 is vented. This prevents any sudden release of pressure when the hermetically sealed unit 42 is subsequently severed from stem 43 at station E. To effect this venting of stem 43, the port 25 of each head 12 is connected to atmosphere, thereby releasing the pressure in stem 43 positioned therein.

At station E, the hermetically sealed pressurized lamp unit 42 is severed from stem section 43 and delivered to a discharge chute.

At station F, the stem section 43 is ejected from turret 10. This completes the tipping-off operations on turret 10 and the empty exhaust 12 is indexed to a load station (not shown) to restart the lamp manufacturing operations.

*Tipping-Off Apparatus and Operating Mechanism*

At station C, burners 34 and 36 are each connected to associated gas-air lines 44 and 46, respectively. Gas lines 44 and 46, in turn, are mounted in common on a cross shaft 48. Each gas line 44 and 46 includes a flexible section 45 and 47, respectively, connected by suitable valves (not shown) to an associated convention gas-air mixer unit and supply (not shown).

To move burners 34 and 36 into and out of operative position adjacent the neck section 28 of a lamp 14 indexed to station C, cross shaft 48 is mounted at one end thereof to one end 49 of a vertical operating arm 50. The other end of arm 50 is fixed to one end of a generally horizontally disposed rocker shaft 52 carried in suitable bearing in support bracket 54. Attached to the other end of shaft 52 is one end of a crank arm 54. The other end of crank arm 54 is pivotally secured to one end of a vertical, reciprocating plunger 56.

To move plunger 56 up and down, it is pivotally connected to a cam lever 58 fulcrumed at 60 on fulcrum support 62 fixed to the main machine frame. The other end of lever 58 is biased by spring 64 into engagement with cam 66 driven from the main machine drive shaft of the exhaust machine. Immediately upon an exhaust head 12 and the lamp 14 therein being indexed to station C, cam 66, driven from the main machine drive shaft, effects, through its associated linkages, a downward movement of plunger 56 in the direction of arrow A, FIGURE 5A. This downward movement of plunger 56 in turn rotates burners 34 and 36 toward turret 10 and into operative tipping-off position on either side of the lamp 14 located at station C.

Simultaneously with the movement of burners 34 and 36 into operative tipping-off position, tube support cup 38 is moved into lamp support position. Tube support cup 38 includes a tube pocket member 68 adapted to engage and surround the portion of the lamp unit 14 to be pressurized (see FIG. 3).

To move pocket 68 into and out of engagement with a lamp 14 positioned at station C, there is provided a tube lift rod 70 fixed at its upper end to pocket 68. At its lower end, tube lift rod 70 is fitted into accommodating recess 72 in the head section 73 of lifting link 74. Lifting link 74 includes a pair of spaced arms 76 and 78 depending from head section 73. Disposed between arms 76 and 78, and pivotally attached thereto, is one end of a link member 80. The other end of link 80 is pinned to a cam lever 82, fulcrumed at 84 on fulcrum support 86 fixed to the main machine frame in a manner similar to cam lever 58. The other end of lever 82 is held in engagement by a spring 88 with a cam 90 driven from the main machine drive shaft.

Tube lift rod 70 is preferably hollow and fitted at its lower end 71, which in the preferred manner of mounting, protrudes from head section 73 of link 74, with a friction fitting 92. Fitting 92, threaded for travel into tube lift rod 70, ensures frictional engagement between rod 70 and link 74.

Upon indexing of a lamp 14 to station C, and simultaneously with the start of movement of burners 34 and 36 into operative position, a preferably double cam 90, driven from the main machine drive shaft, effects, through its associated linkages, a first upward movement of lifting link 74 in the direction of arrow B, FIG. 5A. Since tube lift rod 70 is in frictional engagement with lifting link 74, this movement of link 74 raises rod 70 to move its associated tube pocket 68 into operative lamp supporting position, shown in FIG. 3.

When burners 34 and 36 have heated the pre-heated neck section 28 of lamp 14 to the desired tipping-off temperature, cam 66, through its associated linkages, effects an upward movement of plunger 56 opposite to the direction of arrow A, FIG. 5A. This upward movement of plunger 56 rotates burners 34 and 36 away from turret 10 until the next indexing cycle of the machine.

With burners 34 and 36 moved away from turret 10, pressure chamber 40 is travelled upwardly into sealing engagement with exhaust head 12 at station C. Chamber 40 comprises an enclosed housing 94 having an upper access opening 96 in top section 95 thereof and a lower recess 93 in base section 97 of housing 94. Recesses 93 and 96 accommodate tube lift rod 70 for movement through chamber 40 as chamber 40 is travelled into operative sealing position. Opening 96 is surrounded by a suitable elastomeric sealing gasket 98. Gasket 98 is adapted to engage the undersurface 99 of exhaust head 12 at station C when chamber 40 is travelled upwardly into operative sealing position. Gasket 98 thus seals the interior of housing 94 during the actual tipping-off operation. Housing 94 includes a pair of transparent walls 100 and 102, preferably of transparent plastic to permit visual inspection of the tipping-off operation, and a pair of opposed pneumatic nozzles 103 and 105.

Housing 94 is supported on support member 104 secured to base section 97 thereof. To travel housing 94 into and out of operative sealing position, support member 104 includes a pair of spaced, depending leg sections 106 and 108, adapted to receive therein one end of a guide stud 110 and 112, respectively. Studs 110 and 112 freely pass through an associated flange section 114 and 116, respectively, of a second chamber support member 118. Collars 120 and 122 at each end of their respective studs 110 and 112 assist in maintaining support member 118 in position. Springs 124 and 126 encircling their associated studs 110 and 112 urge member 118 into sealed position on collars 120 and 122 and provide a degree of relative resilient movement between members 104 and 118.

Support member 118 includes a body portion 128 fixed by set screws 129 to tubular shaft member 130. As shown best in FIG. 3, the inner periphery 132 of shaft 130 is spaced from and in concentric relationship with the outer surface 71 of tube lift rod 70. Shaft 130 is provided with an axial slot or opening 134 which accommodates therein a laterally-extending pin 136 carried at one end by rod 70. Body section 128 also includes a slot or opening 138 partially therethrough, which coacts with a portion of slot 134 to accommodate pin 136.

The other end of pin 136 extends through slots 134 and 138 and is positioned for travel between a pair of spaced stop clips 140 and 142 carried by stop clip holder 144 fixed to a stanchion 146 disposed in an opening 147 in base plate 148 of the main machine frame.

Stanchion 146, fixed to plate 148, includes a central opening 145 which accommodates concentric members 130 and 70 for movement therethrough. In addition, stanchion 146 has a portion 149 thereof which extends below plate 148. An upper clamp member 150 is secured to portion 149 and is provided with a leg section 152 accommodating a guide rod 153. A guide member 154 is mounted at one end on guide rod 153. Guide member 154 is provided with a central recess 156 through which passes concentric members 130 and 70.

As described hereinabove, tube rod 70 is frictionally secured in a recess 72 in head section 73 of lifting link 74. Head section 73 also includes a larger recess 158 to accommodate the lowermost end of tubular shaft 130 therein. To retain the lowermost end of shaft 130, head section 73 includes, at one side thereof, a longitudinal slot 160 and a pair of extensions 164 and 166 on each side of slot 160. A lock screw 168 is threaded for travel through extensions 164 and 166, bridging its associated slot 160. Lock screw 168 thus provides clamping engagement between head section 73 of link 74 and shaft 130, ensuring that link 74 and shaft 130 move together.

Figures 3, 4:
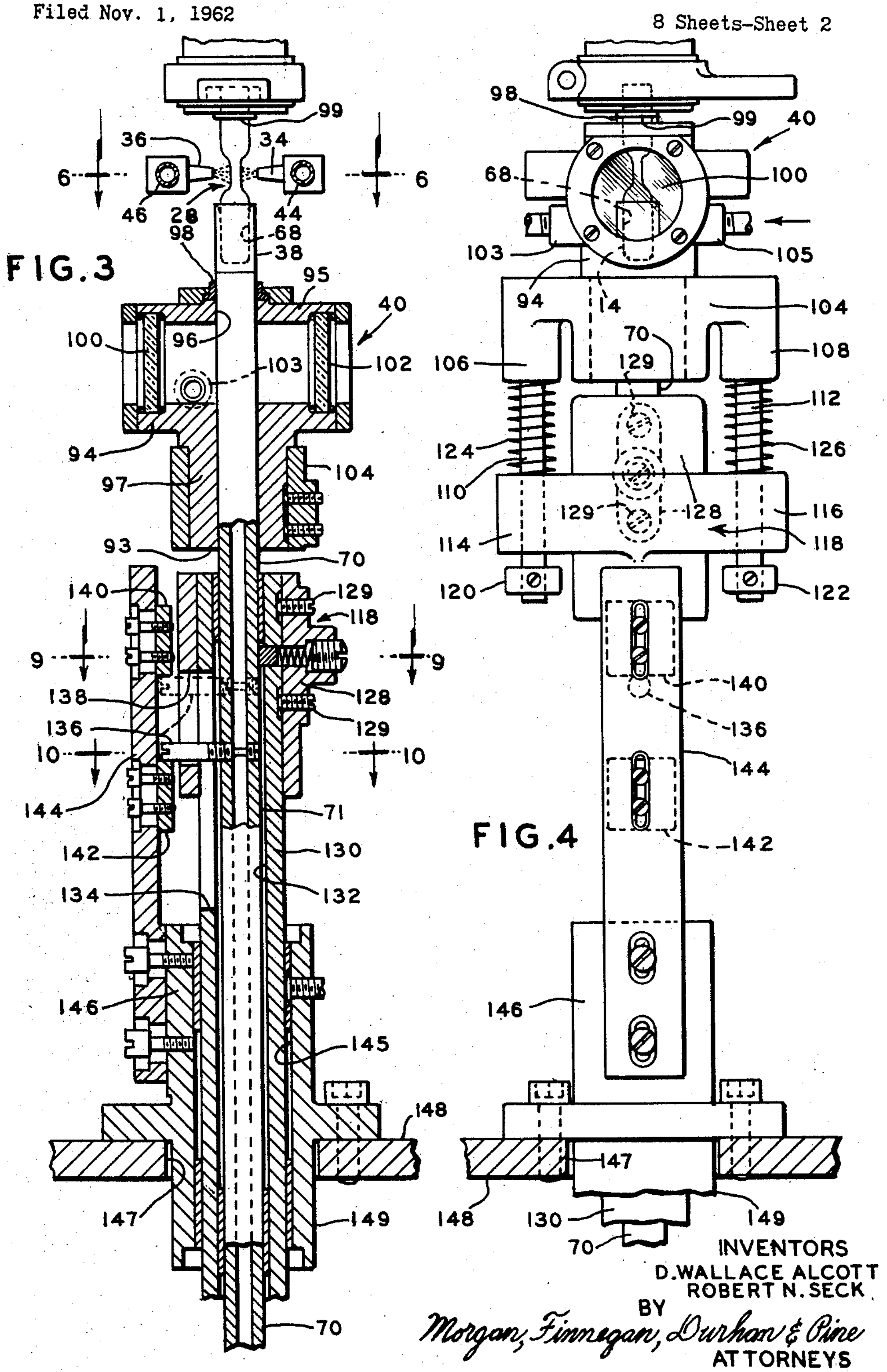
FIGURE 3 is a side elevation partly in section of the tipping-off apparatus of the present invention, with the burners illustrated in operative position.
FIGURE 4 is a front view of the mechanism shown in FIGURE 3 with the sealing chamber in operative position and the burners withdrawn.

In operation, at the start of the tipping-off cycle of operations, when burners 34 and 36 and tube support cup 38 start their travel into operative position as described hereinabove, pin 136 is in contact with lower pin stop clip 140 and at the uppermost section of slots 134 and 138. As link 74 is travelled upwardly by action of cam 90 and its associated linkages, shaft 130 and tube lift rod 70, both in frictional engagement with link 74, are moved vertically upward through guide 154 and stanchion 146 until cup 38 is in operative support position, as shown in FIG. 3, during the operation of burners 34 and 36. This movement of lift rod 70 travels pin 136 secured thereto from its lowermost position against stop clip 140 to its uppermost position against stop clip 142. However, since tube 70 and shaft 130 moved together, pin 136 is still positioned at the uppermost section of slots 134 and 138.

During the operation of burners 34 and 36, the other tipping-off mechanisms remain relatively stationary to provide burners 34 and 36 with unhindered access to neck 28 of lamp 14 at station C. When burners 34 and 36 have heated neck 28 to the desired temperature and have been rotated to non-operative position, cam 90 effects a second successive upward movement of lifting link 74. This second upward movement of link 74 accomplishes the enclosing of lamp 14 by chamber 40.

As link 74 is moved upwardly for the second time, tube rod 70 and shaft 130 are likewise urged upwardly as heretofore. However, since pin 136 of rod 70 is engaged by upper stop clip 142, rod 70 remains in place. Shaft 130 and chamber support member 118, though, do move upwardly during this second movement of link 74, slots 134 and 138 thereof accommodating pin 136 during the relative travel of tube rod 70 and shaft 130.

Since support member 104 is mounted to and travels with support member 118, the second upward movement of member 118 in turn raises member 104 again, moving chamber 40 into operative lamp enclosing position, shown in FIG. 4. Gasket 98 engaging the underface 99 of head 12 seals the interior of chamber 40 during the actual tipping-off process.

It will be understood that when chamber 40 is in its uppermost operative sealing position, shown in FIG. 4, pin 136 is preferably adjacent the lowermost section of slots 134 and 138.

At the completion of the tipping-off process, the pressure in chamber 40 is vented as described hereinbelow and cam 90 effects the downward movement of lifting link 74. Again shaft 130 and rod 70 move together downwardly away from head 12. Thus, cup 38 disengages the tipped-off lamp 14 and gasket 98 disengages the underface 99 of head 12, unsealing the vented interior of housing 94. Shaft 130 and rod 70 continue to move downwardly together until pin 136 now engages low stop clip 140. This arrests further downward travel of rod 70 and its associated members. However, cam 90 continues to move link 74 downwardly. This continued movement of link 74 causes relative movement between shaft 130 and rod 70, travelling shaft 130 further downwardly through stanchion 146 and guide 148. It will be apparent that slots 134 and 138 accommodate pin 136 during the relative movement of shaft 130 and rod 170 until shaft 130 reaches its lowermost position with pin 136 adjacent the uppermost section of slots 134 and 138. In this position, rod 70 and shaft 130 and their respective associated tube support 38 and chamber 40 await the next cyclic tipping-off operation of turret 10.

*Pneumatic System*

Figure 17:
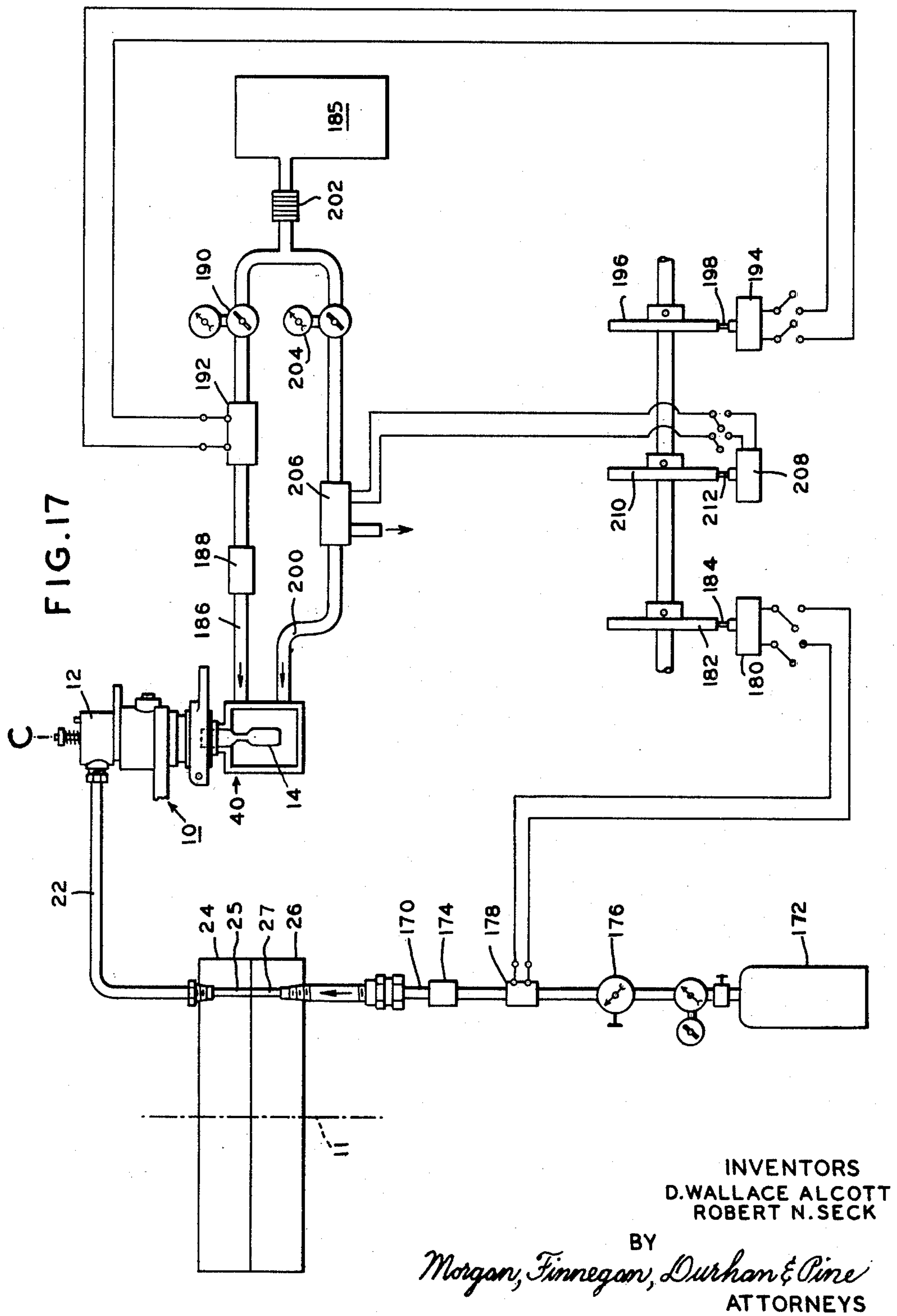
FIGURE 17 is a schematic diagram of a suitable pneumatic control system for the pressurizing and tipping-off of lamp units of the preferred embodiment of the present invention.

Turning to FIG. 17, there is illustrated schematically a suitable pneumatic system for pressurizing and tipping-off lamps 14 at station C.

As described generally hereinabove, when head 12 is indexed to station C on turret 10, the port 25 of rotary valve 24 associated with the particular head 12 at station C is aligned with port 27 in master stationary valve 26.

At station C, port 27 is connected by a pneumatic supply line 170 to a source of pressurized gaseous material to be encapsulated; such as, oxygen, designated generally 172. Preferably line 170 includes a check valve 174, a pressure regulator 176 and a two-way, normally-closed, solnoid-operated control valve 178. Valve 178 in the preferred embodiment is electrically connected to an actuating switch 180. A cam 182 on the main machine drive shaft is adapted to engage operating arm 184 of switch 180, thereby actuating valve 178 at the proper time during the cyclic operation of the machine.

As described hereinabove, lamp 14 is not pressurized to the desired internal pressure until chamber 40 has been seated in sealed operative position around lamp 14. Then, at that time, the interior of lamp 14 and the interior of chamber 40 are pressurized simultaneously to the same pressures. In this way, no "blow-out" or collapse of lamp 14 occurs.

To accomplish the pressurizing of chamber 40, nozzle 103 in housing 94 is connected by an appropriate pneumatic supply line 186 to a source 185 of pressurized gaseous material; such as, oxygen or air. Preferably line 186 includes a check valve 188, a pressure regulator 190, set at the same setting as regulator 176, and a two-way, normally-closed, solenoid-operated control valve 192. Valve 192 is electrically connected to an operating switch 194. A cam 196 on the main machine drive shaft is adapted to engage the operating arm 198 of switch 194 simultaneously with the engagement of arm 184 by cam 182. Thus, pressurized gas is fed simultaneously and at the same pressure into lamp 14 and chamber 40.

To effect the actual tipping-off, nozzle 105 in housing 94 is connected by an appropriate pneumatic supply 200 to a source of pressurized gaseous material, preferably the same source 185 to which line 186 is connected. A filter 202 adjacent source 185 ensures that foreign particles are eliminated from the gaseous material before it is fed into lines 186 and 200. Line 200 preferably includes a pressure regulator 204 and a three-way normally-closed, solenoid-operated control valve 206. Valve 206 is electrically connected to an operating switch 208. A cam 210 on the main machine drive shaft is adapted to engage the operating arm 212 of switch 208, thereby actuating valve 206 at the proper time during the cyclic operation of the machine, to increase the pressure within housing 94 above the pressure inside lamp 14. This increase in external pressure causes the softened neck section 28 to collapse, hermetically sealing the pressured bulb section 42 of lamp 14.

At the completion of the tipping-off operation, cams 182, 196 and 210 are rotated out of engagement with their associated switches 180, 194 and 208, respectively, thus deenergizing solenoid valves 178, 192 and 206. Since valve 206 is a three-way valve, de-energizing therefor effects the venting of the pressure within chamber 40.

Check valve 188 prevents any back pressure build-up in line 186 when valve 206 is actuated. Check valve 174 is employed so that in the event of a leak in head 12, the increased pressure when valve 206 is actuated will not result in a contamination of the source of encapsulated material by a back-flow through line 170.

It will be understood that valves 178 and 192 are not actuated by their associated cams 182 and 196 until chamber 40 is in seated, sealed, operative position adjacent head 12. With chamber 40 in operative position, cams 182 and 196 effect actuation of valves 178 and 192 substantially simultaneously to admit pressure to lamp 14 and chamber 40. When sufficient time has elapsed to fully pressurize lamp 14, cam 210 effects actuation of valve 206 to tip-off or hermetically seal bulb section 42 of lamp 14. After the proper interval to ensure complete sealing of lamp 14, cams 182, 196 and 210 are simultaneously rotated out of engagement with their respective switches until the next cyclic tipping-off operation of the machine.

*Severing Torch and Operating Mechanism*

After the tipped-off or hermatically sealed lamp 14 has had its stem pressure vented at station D, the lamp 14 is indexed to station E where the sealed bulb section 42 is severed from stem 45.

Figure 13:
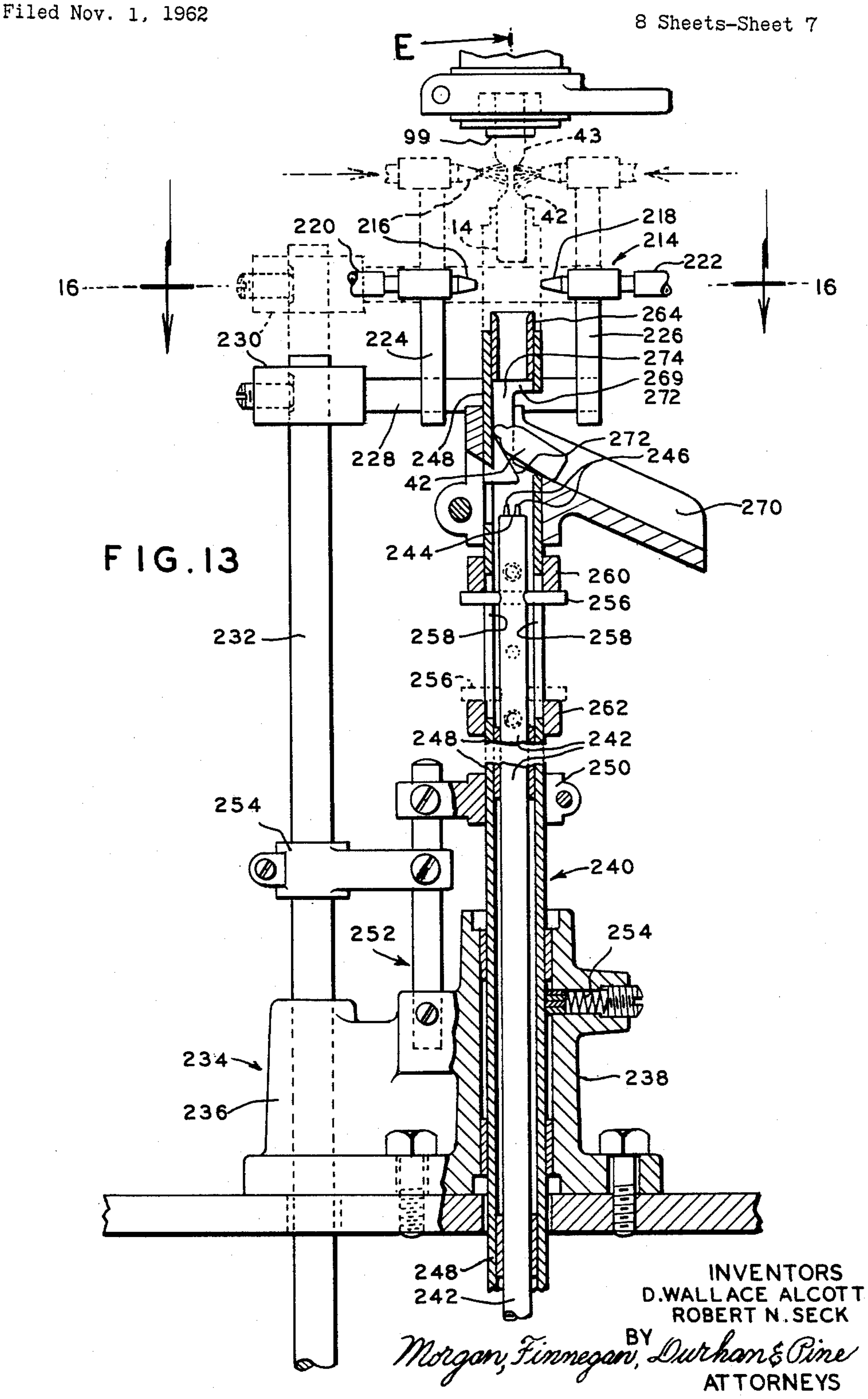
FIGURE 13 is a side elevation partly in section of the lamp unit severing and discharge mechanisms.

To effect this severing, there is provided at station E, and as shown in FIG. 13, a severing torch 214, including a pair of opposed burners 216 and 218 connected by flexible supply lines 220 and 222 to an associated conventional gas-air mixer unit and supply (not shown). Burners 216 and 218 are each mounted on an associated standard 224 and 226, respectively, which are mounted in spaced relationship on a cross-shaft 228. Cross-shaft 228, in turn, includes an end extension 230 secured to the upper end of a vertically-reciprocating operating arm 232. Arm 232 is positioned in guide 234 and adapted for free travel through a section 236 of base member 238 fixed to the main machine frame. It will be understood that arm 232 is mounted for reciprocating vertical travel for reasons set forth in detail hereinbelow and may be actuated by any suitable operating mechanism; such as, a mechanism similar in construction and operation to lifting link 74, which effects reciprocating vertical travel of tube lift rod 70 and shaft 130 at station C. Accordingly, further disclosure thereof is omitted in the interest of brevity.

Coacting with burners 216 and 218 at station E is a tube support and discharge unit designated generally 240. Unit 240 includes a tube support shaft 242 whose upper end terminates in a tube support face 244 having tube support prongs 246 disposed thereon. Shaft 242 is mounted for reciprocating vertical travel within a tubular sleeve 248, shaft 242 being mounted concentrically within sleeve 248. Sleeve 248 is located in a guide 250 mounted in common with guide 234 on a stud shaft 250 fixed to base member 238.

Sleeve 248 is mounted for vertical travel through a section 252 of base 238. Section 252, however, is provided with a lateral, spring-loaded friction snubber unit 254 to assist in maintaining sleeve 252 in vertical position.

To effect relative and conjoint movement of shaft 242 and sleeve 248, shaft 242 includes a lateral pin 256 mounted for travel in opposed longitudinal slots 258 formed in sleeve 248. Upper and lower stop collars 260 and 262, fixed in place on the outer periphery of sleeve 248, are operative to limit the travel of pin 256 therebetween, thereby limiting the amount of relative movement between shaft 242 and sleeve 248.

Shaft 242 is mounted for reciprocating vertical travel for reasons set forth hereinbelow and may be actuated by any suitable operating mechanism; such as, a mechanism similar in construction and operation to lifting link 74 and its associated mechanisms.

In operating, when a lamp 14 is indexed into position at station E, burners 216 and 218 are positioned at each side of the neck section 28 thereof. Simultaneously with the arrival of lamp 14, shaft 242 is travelled vertically upward by its associated operating mechanism to position the tube support face 244 and prongs 246 adjacent the bottom of lamp 14. Coacting with prongs 246 is an annular support ring 264 fixed to the inner periphery of sleeve 248 at the upper terminus thereof. Ring 264 is adapted to enclose the sides of lamp 14 during the severing operation. It will be understood that in this position, shaft 242, sleeve 248 and their associated elements are at their uppermost position with pin 256 in contact with the underface of upper stop collar 260.

When burners 216 and 218 have softened neck 28 to the desired severing temperature, shaft 242 is moved downwardly a short distance, travelling pin 256 downwardly a portion of its total travel in slots 258 and away from collar 260. Since pin 256 is free to travel downwardly in slots 258, no downward force is thus exerted on sleeve 248. Therefore, the sleeve 248 remains in uppermost position during this initial relative downward movement of shaft 242. However, since lamp 14 is supported on shaft 242 and neck section 28 thereof is softened by burners 216 and 218, bulb section 42 follows the downward movement of shaft 242, effects a "stringing-out" of neck 28, severing bulb 42 from stem 45. (See FIGS. 14 and 15.)

The stringing-out operation described above produces a sealed bulb 42 with a sharp tip 266 which is susceptible to damage and likewise is undesirable in subsequent finishing operations. To remove the sharp tip 266, arm 232, associated with burners 216 and 218, is travelled downwardly by its associated operating mechanism, causing burners 216 and 218 to follow tip 266 on bulb 42 downwardly to the string-out position. Burners 216 and 218, it will be understood, continue to apply heat to sharp tip 266, causing it to form into a desirable rounded ball tip 268 (see FIG. 15), suitable for subsequent handling and finishing.

When bulb 42 has been severed and ball tip 268 formed thereon, shaft 242 is again travelled downwardly, moving pin 256 in slot 258 into position adjacent the top face of lower stop collar 262. During this second downward movement of shaft 242, completed bulb 42 is ejected through an accommodating opening 269 in sleeve 248 into a suitable delivery chute 270 fixed to the outer periphery of sleeve 248.

To eject a completed bulb 42, there is provided a cam surface 272 fixed to the inner surface of sleeve 248 and adapted for travel in an accommodating slot 274 in shaft 242, which communicates with support face 244. Cam surface 272 is located in sleeve 248 opposite opening 269. As a completed bulb 42 is travelled downwardly on shaft 242 during the second downward movement thereof, cam surface 272 engages the completed bulb 42 and urges it laterally of sleeve 248 and through opening 269 into delivery chute 270.

During the ejection operation, burners 216 and 218 are preferably returned by arm 232 to operative severing position to await the next lamp 14 delivered to station E.

Figures 12, 14, 15, 16:
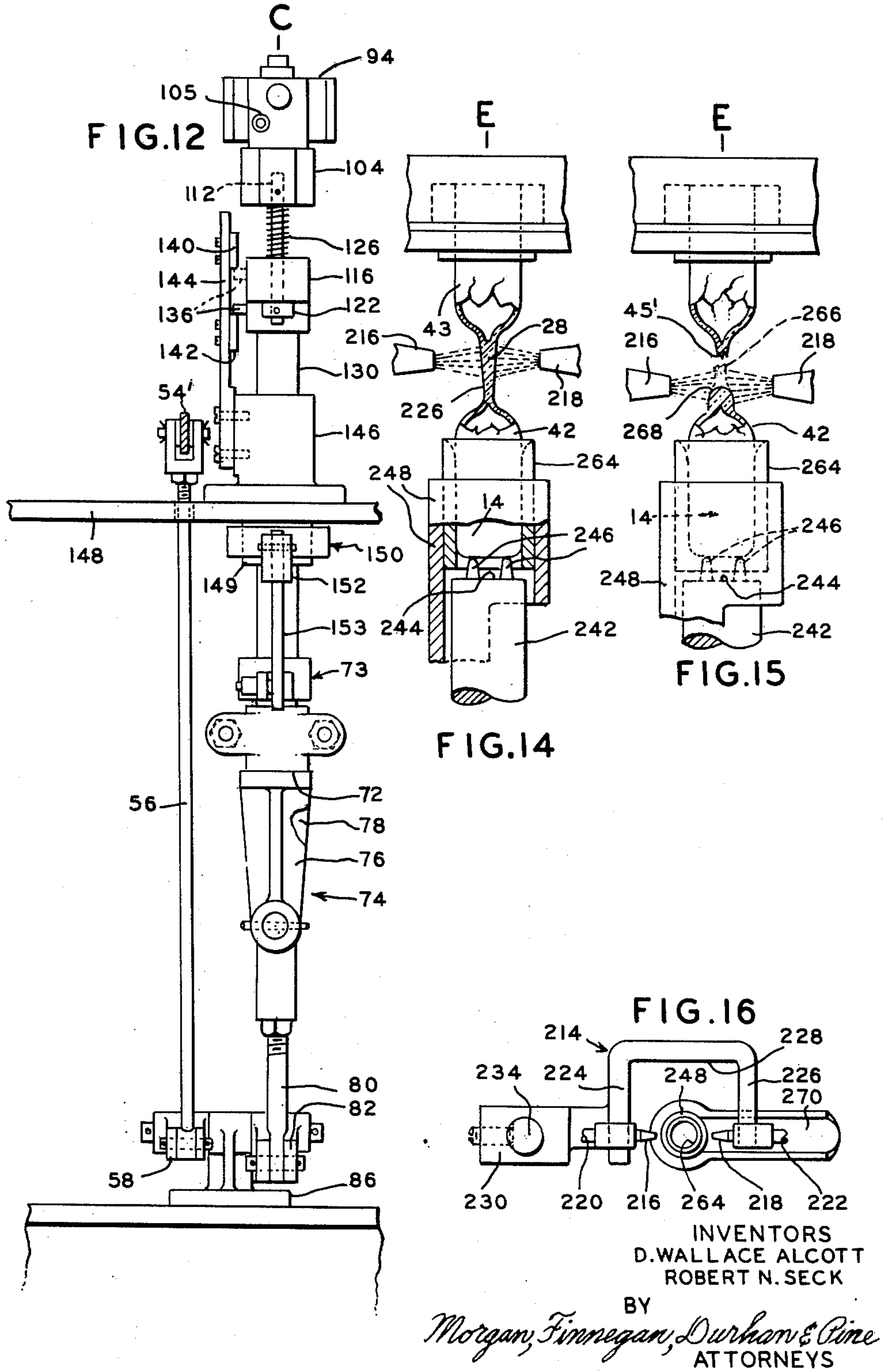
FIGURE 12 is a front view of the sealing chamber and torch mechanism and their respective operating mechanisms.
FIGURES 14 and 15 are views of the sequential steps in the severing operation.
FIGURE 16 is a sectional view taken along line 16—16, FIGURE 13.

After the completed bulb 42 has been ejected, unit 240 is retracted from the path of travel of lamp 14 indexed to station E to await the next lamp 14 travelled thereto on turret 10. To retract unit 240, shaft 242 is travelled downwardly a third time by its associated operating mechanism. Since pin 256 was positioned adjacent lower collar 262 at the completion of the second downward movement, the continued downward movement of shaft 242 effects conjoint downward movement of both shaft 242 and sleeve 248, withdrawing unit 240 from the path of travel of lamp 14 in turret 10. Since burners 216 and 218 straddle the path of travel of lamp 14 on turret 10, as shown in FIG. 16, these burners can be returned to operative severing position during the bulb-ejection step without adverse effect.

It will be understood that to raise unit 240 to operative tube-engaging position, the operating mechanism of shaft 242 need only provide for a single upward movement thereof. Therefore, to provide for the necessary severing operation, shaft 242 is travelled downwardly in three distinct steps by its operating mechanism.

In moving upward into bulb-engaging position, shaft 242 is first moved relative to sleeve 248, travelling pin 256 thereof from adjacent lower stop collar 262 to upper stop collar 260. With pin 256 located adjacent upper collar 260, the continued movement of shaft 242 effects conjoint movement of shaft 242 and sleeve 248 into bulb-engaging position at the start of the next successive severing operation.

Thus, there is disclosed a relatively simple and unique device for producing pressurized vitreous envelopes, such as, photoflash bulbs, which practices a new and novel sequence of operations in producing these pressurized bulbs, resulting in increased production rates for such bulbs and other advantages far beyond any device or method employed heretofore.

While the invention has been described in detail according to the preferred manner of carrying out the method and the device embodying the invention, it will be obvious to those skilled in the art, after understanding the invention, that changes and modifications may be made therein without departing from the spirit or scope of the invention, and it is intended in the appended claims to cover such changes and modifications.

What we claim is:

1. The method of producing hermetically-sealed pressurized units from tubular vitreous envelopes open at one end comprising the steps of initially pressuring the interior of said envelope to a pressure substantially equal to atmospheric pressure, pre-heating the envelope at the section thereof to be sealed, heating the envelope a second time to its sealing temperature adjacent the section to be sealed, enclosing the envelope in a hermetically-sealed environment, simultaneously pressurizing the interior of said envelope and said environment to substantially the same pressure, and increasing the pressure in said environment above the pressure in said envelope whereby said vitreous envelope collapses adjacent its heated section to form a hermetically-sealed pressurized unit in the closed portion of said envelope.

2. The method of producing hermetically-sealed pressurized units from tubular vitreous envelopes open at one end comprising the steps of initially pressurizing the interior of said envelope to a pressure substantially equal to atmospheric pressure, heating the envelope to its sealing temperature adjacent the section to be sealed, enclosing the envelope in a hermetically-sealed environment, simultaneously pressurizing the interior of said envelope and said environment to substantially the same pressure, and increasing the pressure in said environment above the pressure in said envelope whereby said vitreous envelope collapses adjacent its heated section to form a hermetically-sealed pressurized unit in the closed portion of said envelope.

3. The method of producing hermetically-sealed pressurized units from tubular glass envelopes open at one end, said envelopes travelling intermittently through a series of successive work stations comprising the steps of initially pressurizing the interior of said envelope to a pressure substantially equal to atmospheric pressure, pre-heating the envelope at the section thereof to be sealed to a temperature below its sealing temperature, heating the envelope a second time to its sealing temperature adjacent the section to be sealed, enclosing the envelope in a hermetically-sealed environment, simultaneously pressurizing the interior of said envelope and said environment to substantially the same pressure and that pressure being substantially above atmospheric, increasing the pressure in said environment above the pressure in said envelope whereby said vitreous envelope collapses adjacent its heated section to form a hermetically-sealed pressurized unit in closed portion of said envelope, releasing said pressure in said environment and removing said envelope and sealed unit therefrom, releasing the pressure in the unsealed section of said envelope and severing the unsealed section of said envelope from the hermetically-sealed pressurized unit.

4. The method of producing hermetically-sealed pressurized units from tubular vitreous envelopes open at one end comprising the steps of initially pressurizing the interior of said envelope to a pressure substantially equal to atmospheric pressure, pre-heating the envelope a second time to its sealing temperature adjacent the section to be sealed, simultaneously pressurizing the interior of said envelope and the environment immediately surrounding said envelope to substantially the same pressure, and increasing the pressure in said environment above the pressure in said envelope whereby said vitreous envelope collapses adjacent its heated section to form a hermetically-sealed pressurized unit in closed portion of said envelope.

5. The method of producing hermetically-sealed pressurized units from tubular vitreous envelopes open at one end comprising the steps of initially pressurizing the interior of said envelope to a pressure substantially equal to atmospheric pressure, pre-heating the envelope at the section thereof to be sealed, supporting said envelope at its closed end, heating the envelope a second time to its sealing temperature adjacent the section to be sealed, enclosing the envelope in a hermetically-sealed environment, simultaneously pressurizing the interior of said envelope and said environment to substantially the same pressure, and collapsing said tubular envelope at its heated section to form a hermetically-sealed pressurized unit in closed portion of said envelope.

6. The method as defined in claim 5 wherein said collapsing step includes applying lateral forces to said heated section of said envelope.

7. The method as defined in claim 5 wherein said collapsing step includes moving said envelope support laterally to effect collapse of said envelope.

8. The method of producing hermetically-sealed pressurized units from tubular vitreous envelopes open at one end comprising the steps of initially pressurizing the interior of said envelope to a pressure substantially equal to atmospheric pressure, pre-heating the envelope at the section thereof to be sealed, heating the envelope a second time to its sealing temperature adjacent the section to be sealed, enclosing the envelope in a hermetically-sealed environment, simultaneously pressurizing the interior of said envelope and said environment to substantially the same pressure, increasing the pressure in said environment above the pressure in said envelope whereby said vitreous envelope collapses adjacent its heated section to form a hermetically-sealed pressurized unit in closed portion of said envelope, enclosing said collapsed section of said envelope with a mold and decreasing the pressure within said environment below the pressure within said envelope, said envelope pressure expanding said envelope against said mold whereby the portion of said envelope enclosed by said mold assumes said mold shape.

9. Apparatus for producing hermetically-sealed pressurized units from tubular vitreous envelopes open at one end comprising means for delivering a plurality of envelopes seriatim to and through a plurality of tipping-off work stations, exhaust heads, each adapted to receive an envelope, means mounting said exhaust heads on said delivery means, means for indexing said delivery means to intermittently travel each head and associated envelope into registered position at each of said tipping-off work stations, means at the first of said tipping-off work stations connecting said exhaust head and envelope indexed thereto to a source of gaseous material pressurized to substantially atmospheric pressure, first burner means at the second tipping-off work station operative to heat said envelope intermediate its open and closed ends, second burner means at said third tipping-off work station operative to heat said previously heated section of said envelope to a softened sealing state, means connecting said exhaust head and said softened envelope to a source of gaseous material under pressure substantially higher than atmospheric, means for preventing expansion of said softened section during pressurizing of said envelope, and means applying a lateral external force to said softened section of said pressurized envelope to collapse the tubular sidewalls thereof to form a hermetically-sealed pressurized unit in the closed end portion of said envelope.

10. The apparatus as defined in claim 9 wherein said last-named means includes pressure means for increasing the external pressure adjacent the softened section of said envelope above the pressure in said envelopes, said pressure means effecting inward movement of said envelope sidewalls to produce said hermetically-sealed unit.

11. The apparatus as defined in claim 9 including vent means connecting said exhaust head and envelope to atmosphere, means connecting said vent to said head after the formation of said hermetically-sealed unit in said envelope whereby the pressure in the open end portion of said envelope is released, and means severing said open end portion of said envelope from said hermetically-sealed unit.

12. Apparatus for producing hermetically-sealed pressurized units from tubular vitreous envelopes open at one end comprising means for delivering a plurality of envelopes seriatim to and through a plurality of tipping-off work stations, exhaust heads, each adapted to receive an envelope, means mounting said exhaust heads on said delivery means, means for indexing said delivery means to intermittently travel each head and associated envelope into registered position at each of said tipping-off work stations connecting said exhaust head and envelope indexed thereto to a source of gaseous material, pressurized to substantially atmospheric pressure, first burner means at the second tipping-off work station operative to heat said envelope intermediate its open and closed ends, second burner means at said third tipping-off work station operative to heat said previously heated section of said envelope to a softened sealing state, a chamber, means mounting said chamber for movement into operative enclosing positions around said envelope, means for moving said chamber into operative position at the end of said second heating operation, means for connecting said exhaust head and said softened envelope to a source of gaseous material under pressure substantially higher than atmospheric, means for pressurizing the interior of said chamber substantially simultaneously with the pressurizing of said envelope and to substantially the same degree of pressure for preventing expansion of said softened section during pressurizing of said envelope, and means for collapsing the sidewalls at said softened section of said pressurized envelope to form a hermetically-sealed pressurized unit in the closed end portion of said envelope.

13. The apparatus as defined in claim 11 including vent means connecting said exhaust head and envelope to atmosphere, means connecting said vent to said head after the formation of said hermetically-sealed unit in said envelope whereby the pressure in the open end portion of said envelope is released, and means severing said open end portion of said envelope from said hermetically-sealed unit.

14. Apparatus for producing hermetically-sealed pressurized units from tubular glass envelopes open at one end comprising turret means for delivering a plurality of envelopes seriatim to and through a plurality of tipping-off work stations, exhaust heads, each adapted to receive an envelope, means mounting said exhaust heads on said turret, means for indexing said turret to intermittently travel each head and associated envelope into registered position at each of said tipping-off work stations, means at the first of said tipping-off work stations connecting said exhaust head and envelope indexed thereto to a source of gaseous material, pressurized to substantially atmospheric pressure, first burner means at the second tipping-off work station operative to heat said envelope intermediate its open and closed ends, second burner means at said third tipping-off work station operative to heat said previously heated section of said envelope to a softened sealing state, means for travelling said second burner means into and out of operative envelope softening position, a means supporting said envelope during the second heating operation, a chamber at said third tipping-off work station, means mounting said chamber for movement into operating enclosing position around said envelope in timed relation with the movement of said second burner means, means for moving said chamber into operative position at the end of said second heating operation, means for moving said second burner means out of operative envelope softening position at the end of said second heating operation, means for connecting said exhaust head and said softened envelope to a source of gaseous material under pressure substantially higher than atmospheric, means for pressurizing the interior of said chamber substantially simultaneously with the pressurizing of said envelope and to substantially the same degree of pressure for preventing expansion of said softened section during pressurizing of said envelope and means for increasing the chamber pressure above the envelope pressure for collapsing the sidewalls of said softened section of said pressurized envelope to form a hermetically-sealed pressurized unit in the closed end portion of said envelope.

15. The apparatus as defined in claim 14 including vent means connecting said exhaust head and envelope to atmosphere, means connecting said vent to said head after the formation of said hermetically-sealed unit in said envelope whereby the pressure in the open end portion of said envelope is released, and means severing said open end portion of said envelope from said hermetically-sealed unit.

16. The invention as defined in claim 14 including means for severing the open end portion of said envelope from said hermetically-sealed unit at the last of said tipping-off work stations, said severing means comprising a support, means for moving said support into envelope signal position as said envelope and exhaust head are indexed to said severing station, third burner means, for softening said envelope at said collapsed sidewall section thereof to a plasticized condition, means for moving said support away from said third burner to stretch the envelope at said softened section to facilitate severing by said said third burner means of said pressurized unit at the closed end position of said envelope from the open end position thereof, and means for travelling said third burner means toward said support and adjacent the stretched portions of said pressurized unit to form a rounded tip on the severed portion of said unit.

17. The invention as defined in claim 16 including discharge means associated with said support for ejecting finished units from said support to a delivery chute.

18. In a device for producing hermetically-sealed pressurized units from tubular glass envelopes, said device having a plurality of travelling exhaust heads, each to receive an envelope, apparatus for tipping-off an envelope containing gas at a pressure higher than atmospheric, comprising means connecting each exhaust head and envelope travelled thereto to a source of gaseous material pressurized to substantially atmospheric pressure, first burner means operative to heat said envelope intermediate its open and closed ends, second burner means operative to heat said previously heated section of said envelope to a softened sealing state, means for supporting said envelope during the second heating operation, a chamber, means mounting said chamber for movement into operating enclosing position around said envelope at the end of said second heating operation, means for connecting said exhaust head and said softened envelope to a source of gaseous material under pressure substantially higher than atmospheric, means for pressurizing the interior of said chamber substantially simultaneously with the pressurizing of said envelope and to substantially the same degree of pressure for preventing expansion of said softened section during pressurizing of said envelope, and means for collapsing the sidewalls of said softened section of said pressurized envelope to form a hermetically-sealed pressurized unit in the closed end portion of said envelope.

19. In a device for producing hermetically-sealed pressurized units from tubular glass envelopes, said device having a plurality of travelling exhaust heads each adapted to receive an envelope, apparatus for tipping-off an envelope containing gas at a pressure higher than atmospheric comprising means connecting each exhaust head and envelope travelled thereto to a source of gaseous material pressurized to substantially atmospheric pressure, first burner means operative to heat said envelope intermediate its open and closed ends, second burner means operative to heat said previously heated section of said envelope to a softened sealing state, means for travelling said second burner means into and out of operative envelope softening position, a means supporting said envelope during the second heating operation, a chamber means mounting asid chamber for movement into operating enclosing position around said envelope in timed relation with the movement of said second burner means, means for moving said chamber into operative position at the end of said second heating operation, means for moving said second burner means out of operative envelope softening position at the end of said second heating operation, means for connecting said exhaust head and said softened envelope to a source of gaseous material under pressure substantially higher than atmospheric, means for pressurizing the interior of said chamber substantially simultaneously with the pressurizing of said envelope and to substantially the same degree of pressure for preventing expansion of said softened section during pressurizing of said envelope, and means for increasing the chamber pressure above the envelope pressure for collapsing the sidewalls of said softened section of said pressurized envelope to form a hermetically-sealed pressurized unit in the closed end portion of said envelope.

20. In apparatus for tipping-off envelopes containing pressure higher than atmospheric by collapsing the sidewalls thereof to produce hermetically-sealed pressurized units therein, a mechanism for severing said pressurized units from the remainder of said envelopes comprising a support, means for moving said support into envelope support position, burner means for softening said envelope at said collapsed sidewall section thereof to a plasticized condition, means for moving said support away from said burners to stretch the envelope at said softened section to facilitate severing by said burner means of said pressurized unit portion of said envelope from the remainder thereof, and means for travelling said burner means toward said support and adjacent the stretched severed portions of said pressurized unit to form a rounded tip thereon.

21. The invention as defined in claim 20 including discharge means associated with said support for ejecting finished units from said support to a delivery station.

References Cited in the file of this patent

UNITED STATES PATENTS

| | | |
|---|---|---|
| 2,235,515 | Carpenter | Mar. 18, 1941 |
| 2,403,073 | Geiger et al. | July 2, 1946 |
| 2,637,942 | Hinkley | Mar. 12, 1953 |